Sept. 15, 1931.  H. E. HOLCOMB  1,822,891
APPARATUS FOR MAKING SHEET MATERIAL
Filed June 1, 1929

INVENTOR
Harry E. Holcomb.
BY
ATTORNEYS

Patented Sept. 15, 1931

1,822,891

UNITED STATES PATENT OFFICE

HARRY E. HOLCOMB, OF STRATFORD, CONNECTICUT, ASSIGNOR TO FIBERFRAKS INC., OF NEW YORK, N. Y., A CORPORATION OF NEW YORK

APPARATUS FOR MAKING SHEET MATERIAL

Application filed June 1, 1929. Serial No. 367,798.

In the cylinder type of machine for making sheet material the movement of the felt or other conducting carrier tends to move the fibres of the sheet into approximate parallelism with the direction of movement of the sheet. This results in a sheet which is considerably weaker in the transverse direction than in the lengthwise direction.

One object of my invention is to form a sheet of asbestos fibre and hydraulic cement, particularly for use in the making of shingles, and in which there is no prevailing direction of the fibres. Shingles made from my improved material have the same flexibility in one direction as in another and are not easily broken or split by rough handling, nailing in place, or when walked upon.

In the ordinary cylinder machine it is difficult to make a sheet of uniform composition where the sheet is made up of a mixture of different ingredients, such for instance as, asbestos fibre and hydraulic cement. The materials tend to segregate and are picked up to a different extent by the felt. This is partly due to the fact that the web is formed upon the under or outer surface of the cylinder as the latter is rotated and gravity tends to move the material away from the collecting felt or belt.

Another object of my invention is to provide an apparatus in which the material tends to settle by gravity onto the collecting belt so that all of the solid material is eventually collected and formed into the web or sheet in the same proportions in which it is added to the apparatus.

In carrying out my invention I provide a pair of rotary disks or end walls which are spaced apart to a distance equal to the width of the desired sheet and use the collecting belt to bridge across from the under side of one disk to the other so that the chamber for the mixture is formed solely by the disks and the collecting belt.

By means of my invention the width of the sheet may be varied as desired by adjusting the disks toward and from each other, and the sheet may be built up to the desired thickness on the belt which forms the bottom wall of the chamber. The sheet may be delivered as a continuous web of the desired thickness, for instance, one-eighth to three-sixteenths of an inch, and fed directly to the apparatus which cuts it into the shingles of the desired size.

As one important feature I employ a fine mesh, woven wire cloth as the bottom of the chamber and the collecting and conveying belt. In the usual apparatus the belt is formed of felt and is of comparatively short life due to the action of the lime content in the cement which rots the felt and causes it to become weak and tear or wear away quickly. This felt is very expensive and the life when subjected to the action of lime is comparatively short and uncertain. By the use of fine mesh, woven wire cloth which is not affected by lime, the life of the belt is very greatly increased and the belt is more easily washed and cleaned of adhering material after it is separated from the sheet which is produced.

As another feature of my improved process I do not let any water go to waste and thus do not require any save-all or other apparatus. None of the solid material is wasted as the water which is withdrawn from the machine returns to the mixing chamber and carries with it any solid material which may have passed through the woven wire belt.

As another feature I provide a vacuum chamber located beneath the belt in the tank so that the material is caused to adhere to the belt not only by gravity, but by suction, and thus does not tend to slip or shift position on its way to the couch roller where the excess water is squeezed out and returned directly to the apparatus.

In the accompanying drawings I have illustrated merely one embodiment of a machine involving my invention and suitable for carrying out my improved process.

Figures 1, 2:
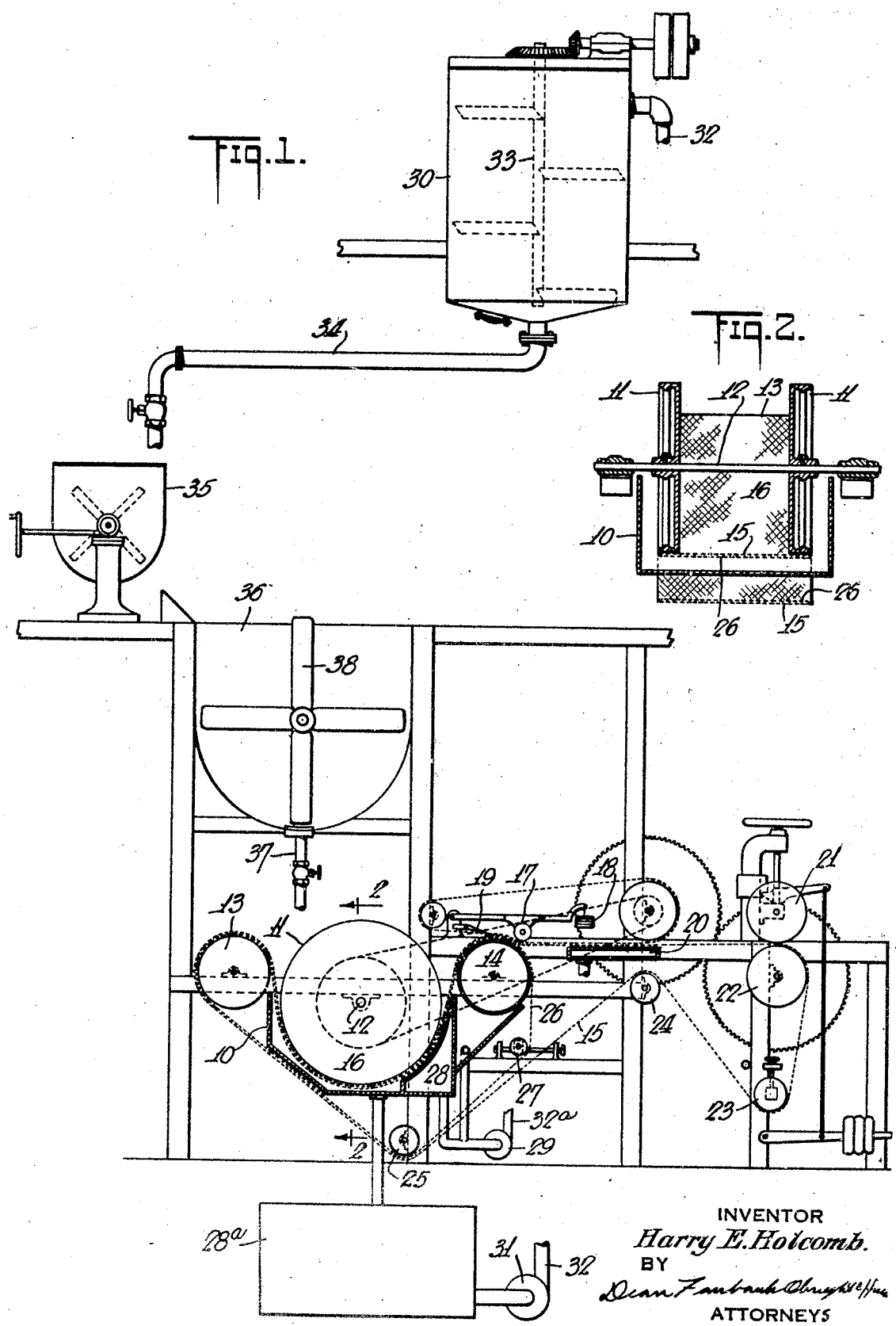
Fig. 1 is a side elevation partly in section and partly diagrammatic.
Fig. 2 is a vertical section on the line 2—2 of Fig. 1.

In the construction illustrated there is provided a tank or vat 10 in which are mounted a pair of disks 11 each having a comparatively wide rim or peripheral surface. The disks are mounted on a shaft 12 and are adjustable toward and from each other to vary the width of the sheet to be produced as will hereinafter be explained more in detail. Approximately the lower half of each disk projects into the tank or vat and suitable means hereinafter referred to are provided for rotating the shaft 12.

At opposite sides of the two disks and outside of the tank are a pair of rollers 13 and 14 which are preferably idler rollers although they may be positively driven if desired. An endless belt of fine, woven wire cloth 15 extends over these two rollers and along approximately the lower half of the circumference of the two disks. The belt is of such width that it may be drawn taut on the periphery of the disks so that a chamber or compartment 16 is formed with the cloth as the bottom and the two disks as end walls. Into this chamber is placed the material from which the sheet is to be formed.

The roller 14 is preferably perforated and serves to coact with a couch roller 17 which may be supported by a pivoted arm and held in place by a weight 18. In advance of the couch roller is a sluice board 19 for preventing the water from running back down the sheet into the tank from the couch roller. The roller 14 is mounted above and partly within a chamber which collects the water which is forced from the sheet to the interior of the roll. This water may be returned to the water storage tank hereinafter referred to.

The fine wire cloth with the adhering sheet is carried over the roller 14, beneath the sluice board 19 and the couch roller 17, and may then be delivered over a suction box 20 for removing the additional water. The carrier cloth and the produced sheet or web then pass between delivery rollers 21 and 22 to any suitable conveying apparatus not illustrated. The cloth passes down from the roller 22, around a tensioning roller 23 and guide rollers 24 and 25, beneath the tank 10 and back to the roller 13.

In case the disks 11 are spaced to a considerable distance apart and there is a tendency of the fine, woven cloth to sag or draw in between the disks, it may be and preferably is supported by an outer coarse mesh, wire cloth or screen 26. This may pass over the rollers 13 and 14 and beneath the disks 11 in parallelism with the fine mesh cloth 15 and around a tensioning roller 27 to the under side of the roller 25. As above intimated this endless, coarse mesh belt or sheet may in some cases be omitted.

Into the chamber 16 may be delivered the desired mixture. This is preferably formed of about 10% to 20% asbestos fibre and 80% to 90% by weight of hydraulic cement with sufficient water to give the desired consistency. The sheet of this asbestos fibre and cement will form on the upper side of the belt 15 between the two disks and its width will be determined by the spacing of the disks. It is carried from the tank by the belt 15 and thereafter treated in the usual manner. It will be noted that the rotation of the disks and the movement of the belt tend to keep the mixture agitated, but that any tendency of the mixture to settle will bring it directly onto the belt 15 where it is desired. In this way and by controlling the consistency of the mixture a layer of any desired thickness may be built up, and as the mixture is brought onto the belt by gravity the asbestos fibres will not have any prevailing direction and the sheet will have uniform strength transversely and longitudinally.

Preferably within the tank 10 there is mounted a suction box 28 with a curved wall closely adjacent to the outer surface of the belts 15 and 26 and by applying a partial vacuum to this box the fibres and cement are compacted on the inner surface of the belt 15 and are held on the latter until after the belt reaches a point above the level of the liquid in the tank. The wall of the suction box 28 may be formed of reticulated metal of any desired character. The water may be withdrawn from the suction box 28 and a partial vacuum created therein by a pump 29.

As shown there is a mixing chest 30 to which a centrifugal pump 31 delivers the water and fine fibre through a pipe 32 (portions of which are omitted to avoid confusion) directly from the collecting tank 28a to the mixing chest. The pump 29 may also deliver water from the vacuum box 28 through pipe 32a to the chest 30. In the mixing chest may be employed any suitable form of agitator 33 whereby the cement and fibre in the water are kept from settling. The water and fine mixture which went through the filter belt 15 is delivered from this chest through a pipe 34 to a batch stock chest 35 to which additional fibre and cement are added which may also have an agitator. As each batch is mixed it is delivered to a chest 36 from which it may be admitted intermittently or continuously to the tank 10 by a pipe 37. This chest 36 is also provided with an agitator 38 to prevent settling or stratification in the chest. Thus none of the water is wasted and all of the solid material which leaves the tank 10 is returned to the system. It is only necessary to deliver additional water to the chest 30 to make up for evaporation losses and for water delivered in the web or sheet itself.

Having thus described my invention, what I claim as new and desire to secure by Letters Patent is:

1. An apparatus for forming sheet material, including a pair of coaxially spaced disks, and a conveying and sheet collecting belt engaging the lower portions of the peripheries of the disks and forming therewith a chamber to receive the mixture from which the sheet is to be formed.

2. An apparatus for forming sheet material, including a tank, a pair of coaxially spaced disks having their lower portions projecting into the tank, and a sheet collecting belt extending into and out of the tank around the lower portions of said disks and bridging across from one to the other to form a chamber therebetween for the material from which the sheet is to be formed.

3. An apparatus for forming sheet material, including a pair of coaxial disks, a wire filtering cloth extending along the lower peripheries of the disks and bridging across from one to the other, and means for rotating said disks and advancing the cloth.

4. An apparatus for forming sheet material, including a tank, a transverse shaft, a pair of disks mounted on said shaft and adjustable toward and from each other, the lower portions of said disks extending into said tank, and means for advancing a woven wire filtering cloth into and out of the tank along the peripheries of the disks, the width of the cloth being such as to bridge across from one to the other.

5. An apparatus for forming sheet material, including a tank, a pair of coaxially spaced disks mounted for rotation about a horizontal axis and having their lower portions projecting into said tank, an endless conveyor belt extending into and out of said tank along the lower portions of the peripheries of said disks and bridging across from one to the other, and a second reinforcing endless conveyor belt following the course of the first mentioned belt upon the outer surface of the latter within said tank.

6. An apparatus for forming sheet material, including a tank, a pair of coaxially spaced disks rotatable about a horizontal axis and having their lower portions extending into said tank, a pair of idler rollers upon opposite sides of said tank, a fine mesh, endless, woven wire cloth extending around said idler rollers and into and out of said tank beneath said disks and engaging with the peripheries of the latter, and means for delivering to the space between the disks the material from which the sheet is to be formed.

7. An apparatus for forming sheet material, including a tank, a pair of coaxially spaced disks rotatable about a horizontal axis and having their lower portions extending into said tank, a pair of idler rollers upon opposite sides of said tank, a fine mesh, endless, woven wire cloth extending around said idler rollers and into and out of said tank beneath said disks and engaging with the peripheries of the latter, means for delivering to the space between the disks the material from which the sheet is to be formed, and a suction box within said tank and adjacent to the outer surface of said cloth.

8. An apparatus for forming sheet material, including a tank, a pair of coaxially spaced disks rotatable about a horizontal axis and having their lower portions extending into said tank, a pair of idler rollers upon opposite sides of said tank, a fine mesh, endless, woven wire cloth extending around said idler rollers and into and out of said tank beneath said disks and engaging with the peripheries of the latter, means for delivering to the space between the disks the material from which the sheet is to be formed, one of said idler rollers being perforated, a couch roller for pressing the sheet and cloth onto said roller, and means for returning to said tank the water forced into said perforated roller by said couch roller.

9. An apparatus for forming sheet material, including a tank, a pair of coaxially spaced disks rotatable about a horizontal axis and extending into said tank, a filter cloth extending into and out of the tank along the lower peripheries of the disks and bridging across from one to the other, a stock mixing chest, means for delivering the material from said chest to the space between said disks, and means for returning to said chest water from said tank and which has passed through said filter cloth.

Signed at New York, in the county of New York and State of New York, this 31st day of May A. D. 1929.

HARRY E. HOLCOMB.